Jan. 7, 1969  D. B. PRICE  3,420,485

SUPPORT FOR ROOM HEATER

Filed July 22, 1966

INVENTOR
David B. Price
BY
AGENT

United States Patent Office 3,420,485
Patented Jan. 7, 1969

3,420,485
SUPPORT FOR ROOM HEATER
David B. Price, Mansfield, Ohio, assignor to Westinghouse Electric Corporation, Pittsburgh, Pa., a corporation of Pennsylvania
Filed July 22, 1966, Ser. No. 567,262
U.S. Cl. 248—188.3　　　　　　　　　　2 Claims
Int. Cl. F16m *11/10*

ABSTRACT OF THE DISCLOSURE

Combination tilting and self-leveling support structure for an appliance such as a space heater. The support structure is characterized by the provision of a pair of legs which are pivotally connected to the appliance casing for independent movement, there being bias means interposed between the casing and each of the legs to provide a friction coupling therebetween.

---

This invention relates, in general, to domestic appliances and, more particularly, to support means therefor.

Appliances of the type herein contemplated, for example, electric space heaters, have utilized support structures which permit tilting of the heater housing to direct the heat emanating therefrom in a preferred direction. Various complicated and expensive constructions have been employed which usually necessitate some sort of cumbersome or awkward manipulation for producing the desired tilt angle. Furthermore, such constructions as found in the prior art are unstable with respect to the floor or other such supporting surface upon which it is placed.

Accordingly, it is the general object of this invention to provide a new and improved support structure for domestic appliances.

It is a more particular object of this invention to provide a new and improved support structure for a domestic appliance which permits tilting of the appliance relative to the support structure and provides for level orientation of the appliance when the support structure rests on other than a completely flat surface.

Another object of the invention is to provide a new and improved support structure for an appliance which facilitates tilting of the appliance by the user.

Still another object of this invention is to provide a new and improved support structure which utilizes a minimum number of parts, is simple in construction and is inexpensive.

Briefly, the above-cited objects are accomplished by providing a pair of U-shaped legs each having a threaded rod or shaft formed integrally therewith. The legs are adapted to be pivotally mounted at each side of an appliance housing by inserting the threaded rod through an aperture in the side of the housing from the outside thereof. A spring washer captivated between the inner surface of the side wall and a nut inserted on the threaded portion of the rod serves as a frictional coupling between the former and the latter and is thereby effective to permit the appliance housing to be readily tilted to various positions with respect to the legs and also to retain the housing in the tilted position. The legs are pivotally mounted to the housing independently of each other and, therefore, the appliance including the support structure is self-leveling. For example, if the appliance including the support structure were moved from a completely flat surface when the appliance was tilted at a predetermined angle, or for that matter in a level position, to an uneven or irregular surface, the legs would self-adjust to compensate for any unevenness while the appliance would retain the same angle or tilt.

Other objects and advantages of the present invention will become more apparent when considered in view of the following detailed description and drawings, in which.

Figure 1:
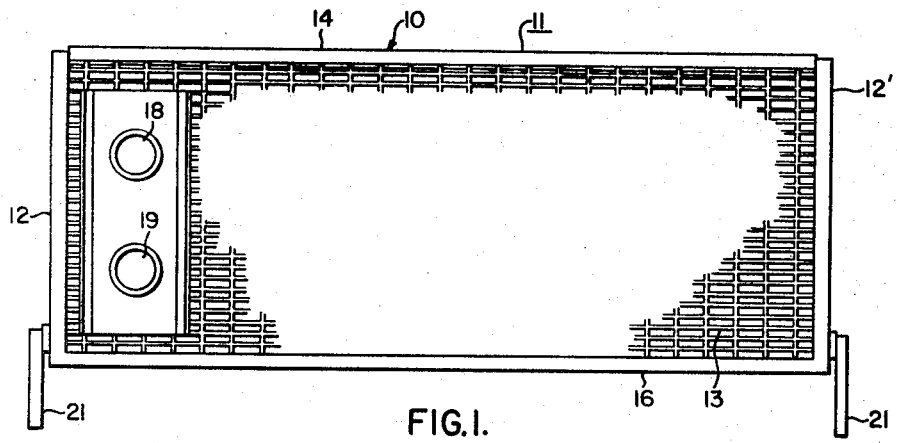
FIG. 1 is a front elevational view of a portable space heater incorporating the invention.
Figure 2:
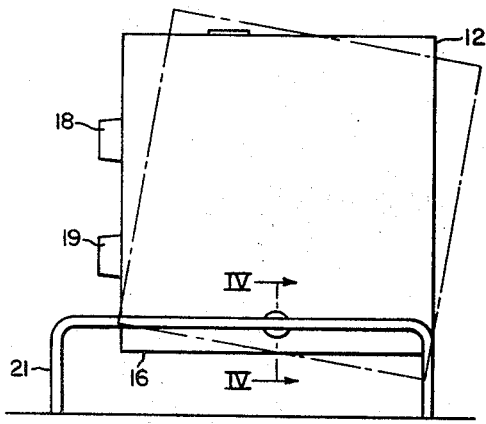
FIG. 2 is a side elevational view of the heater shown in FIG. 1.
Figure 3:
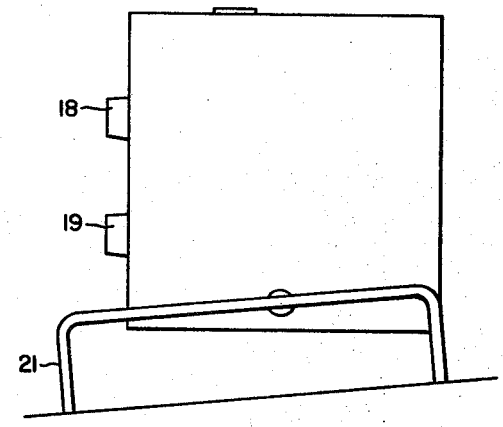
FIG. 3 is another side elevational view of the heater shown in FIG. 1, but in a different operating position from that shown in FIG. 2.

Referring to the drawings, especially FIGURE 1, reference character 10 designates generally a portable space heater comprising a substantially rectangular housing 11 including spaced apart side walls 12 and 12'. A grill member 13 is supported at the front of the housing 11 by the side walls 12 and 12' and a top wall 14 and a bottom wall 16. A conventional source of heat (not shown) as well as air circulating or fan means and a polished reflector (not shown) are supported within the housing 11 intermediate the grill member 13 and a rear wall 17.

An ON-OFF control knob 18 serves to selectively control energization of the heater elements and the fan while a heat control knob 19 serves to adjust the thermostat (not shown) to vary the output of the heater elements.

To support the housing 11 a support structure comprising a pair of substantially U-shaped leg members 21 is provided. Each of the leg members 21 is adapted to be pivotally attached to one of the side walls 12 and 12'. To this end each of the leg members 21 is provided with an integral shaft or rod 22 which is insertable through a suitable aperture 23 provided in each of the side walls 12 and 12'. Each shaft or rod 22 is threaded as indicated at 24 for receiving a suitable fastener herein illustrated as a hexagonal nut 26.

Figure 4:
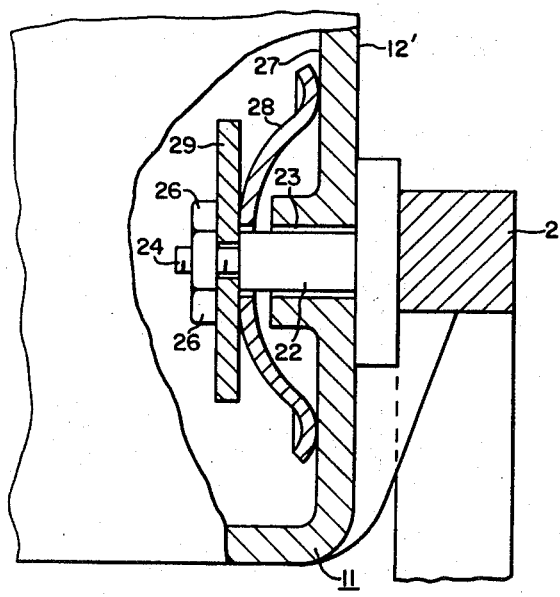
FIG. 4 is a cross-sectional view taken on the line IV—IV of FIG. 2.

Captivated between the nut 26 and the inner surface of the side wall 12 is a spring washer 28 and a flat washer 29. The spring washer is compressed therebetween, as shown in FIGURE 4, to provide frictional coupling between the side walls 12 and 12' and the corresponding leg member 21 whereby the housing 11 may be readily tilted to a number of positions and retained in any one of the positions as desired.

It should now be apparent that there has been provided a support structure for domestic appliances which facilitates tilting of the appliance to various positions and retained in a desired position by such structure. The support structure herein disclosed is also capable of stabilizing the appliance including the support structure on an uneven or irregular supporting surface.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

What is claimed is:

1. Support structure for a domestic appliance including a housing, said structure comprising: a pair of leg members, means for pivotally attaching said leg members to opposed portions of said housing, and bias means cooperating with said attaching means and said opposed portions to provide frictional coupling therebetween whereby said housing is adapted for tilting relative to said legs by movement of said housing and said bias means serves to retain said housing in a plurality of tilted positions, said attaching means comprising shaft means formed integrally with each leg member and insertable through one of said opposed portions and retaining means carried on the end of said shaft, and said bias means comprising a spring washer intermediate said retaining means and the inner surface of said one of said opposed portions, said leg members being substantially U-shaped and said shaft means being threaded adjacent the free end thereof for receiving said retaining means.

2. Structure as specified in claim 1, wherein each opposed portion comprises a substantially vertical wall provided with an aperture and said shaft is insertable through said wall from the outside thereof.

References Cited

UNITED STATES PATENTS

| | | | |
|---|---|---|---|
| 475,977 | 6/1892 | Dillingham | 248—137 X |
| 1,628,218 | 6/1927 | Beauchamp | 248—478 X |
| 1,792,993 | 2/1931 | Lochner | 248—137 X |
| 2,924,495 | 2/1960 | Haines | 312—251 |
| 2,979,857 | 4/1961 | Longbotham | 248—188.2 |
| 3,204,906 | 9/1965 | Henderson | 248—188.3 |

CHANCELLOR E. HARRIS, *Primary Examiner.*

U.S. Cl. X.R.

312—251; 248—137